United States Patent
Radin

[15] 3,644,885
[45] Feb. 22, 1972

[54] LOW LIQUID LEVEL INDICATOR
[72] Inventor: Bernard G. Radin, Oak Park, Mich.
[73] Assignee: Ford Motor Company, Dearborn, Mich.
[22] Filed: June 22, 1970
[21] Appl. No.: 48,064

[52] U.S. Cl.............................340/59, 73/304 R, 307/10 R, 340/244 C
[51] Int. Cl..........................................................G01f 23/00
[58] Field of Search ..............340/59, 244 C; 307/10 R, 118, 307/132 T; 73/304 R; 200/19 R, 61.05; 321/49, 48

[56] References Cited

UNITED STATES PATENTS

| | | | |
|---|---|---|---|
| 3,550,080 | 12/1970 | Wenzel | 340/59 |
| 2,618,248 | 11/1952 | Lindberg, Jr. et al. | 340/244 C |
| 2,176,531 | 10/1939 | Elsome-Jones | 321/49 |
| 3,089,073 | 5/1963 | Godshalk | 307/10 R |

Primary Examiner—John W. Caldwell
Assistant Examiner—Glen R. Swann, III
Attorney—John R. Faulkner and Keith L. Zerschling

[57] ABSTRACT

A low liquid level indicator particularly adapted for use in an automotive vehicle which includes a probe adapted to complete an electrical circuit to the container of the liquid when the liquid is at a satisfactory operating level. A bimetallic pulse-producing means is connected to the source of electrical energy for the vehicle thereby cyclically coupling the source of electrical energy to the probe through an AC coupling means. A voltage divider is formed by means of a resistor and the impedance of the probe and the container. A solid-state switching network, which controls a warning means, is connected to the junction of the resistance and this impedance. When the liquid is above or equal to the satisfactory operating level, the impedance between the probe and the container is sufficiently low that the switching network will not energize the warning means. When the liquid level, however, falls below this satisfactory operating level, this impedance rises sufficiently to switch the switching network into a conducting state thereby energizing the warning means.

3 Claims, 2 Drawing Figures

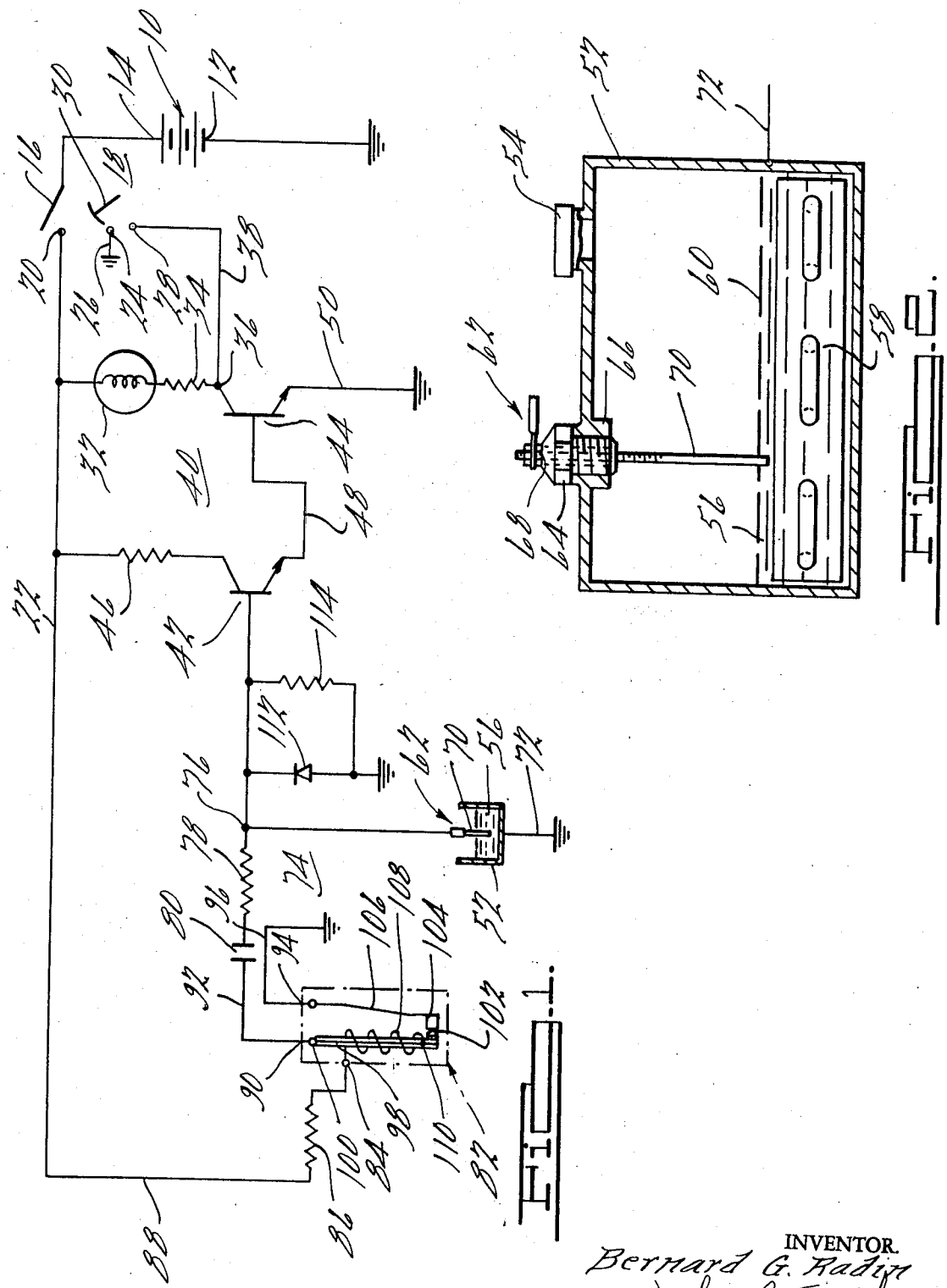

LOW LIQUID LEVEL INDICATOR

BACKGROUND OF THE INVENTION

This invention relates to a low liquid level indicator and, more particularly, to a low liquid level indicator that may be readily used to indicate a low liquid level in a container, for example, a radiator, used in an automotive vehicle.

In the conductivity type of liquid level sensors, alternating current is used in preference to direct current because it eliminates plating or deposits on the electrodes of the probe immersed in the liquid. There have been suggestions in the prior art for using an alternating current to energize liquid level sensing means. It has been suggested, for example, that in an automotive vehicle, alternating current be derived from the stator windings of the alternator employed to generate electrical energy for charging the vehicle battery and for operating the electrical loads of the vehicle.

The present invention utilizes a novel liquid level detector circuit and includes an inexpensive reliable means for generating the alternating current applied to the probe and container carrying a liquid to sense the liquid level in the container.

SUMMARY OF THE INVENTION

In the present invention, a bimetallic means is employed for cyclically and periodically coupling a source of direct current electrical energy to a probe positioned in a container through an AC coupling means, for example, a capacitor. A fixed resistor is preferably located in series with the capacitor and the probe thereby producing at the junction of these components an alternating current signal having a magnitude which is a function of the impedance between the probe and the container. When the level of the liquid in the container is at a satisfactory operating level, the probe is connected or coupled to the container through the liquid in the container. As a result, the impedance of the probe to container circuit is low.

A solid-state switching network has a control electrode connected to the junction of the resistor and the probe and rectifying means are positioned between this junction and the control electrode for rectifying the alternating current present at this junction. This switching network controls the energization of a warning means, for example, a warning lamp, from the source of electrical energy. When the impedance of the probe to container circuit is low, an insufficient voltage is present on the control electrode to cause the switching network to energize the warning means or lamp. When however, the liquid in the container falls to unsatisfactory operating level, the impedance of the probe to container circuit rises sufficiently to apply sufficient potential on the control electrode of the switching network to cause this network to energize the warning lamp or other warning means.

An object of the present invention is the provision of a low liquid indicator which is inexpensive and reliable.

Another object of the invention is the provision of a low liquid indicator which is inexpensive and reliable and employs alternating current electrical energy to energize a liquid level sensing probe positioned in the container for the liquid.

A further object of the invention is the provision of a low liquid level indicator that employs a reliable and inexpensive means for generating an alternating current signal to be applied to a liquid level sensing probe and the container holding the liquid.

Other objects and attendant advantages of the present invention will become more readily apparent as the specification is considered in connection with the attached drawings.

BRIEF DESCRIPTION OF THE DRAWINGS

FIG. 1 is a circuit diagram of the low liquid level indicator of the present invention; and FIG. 2 is a sectional view through a liquid container and showing the relationship of the container, the liquid and the probe of the present invention.

DESCRIPTION OF THE PREFERRED EMBODIMENT

Referring now to the drawings in which like reference numerals designate like parts throughout the views thereof, there is shown in FIG. 1 a source of direct current electrical energy in the form of an electrical storage battery 10 having one terminal thereof, negative terminal 12, connected to ground, and the other terminal thereof, positive terminal 14, connected to a conductive movable arm 16 of ignition switch 18. The ignition switch 18 has an "ON" terminal 20 connected to a line 22. The ignition switch 18 also has associated therewith a second stationary terminal 24 that is connected to ground through a lead 26, and a third stationary terminal 28. A second conductive movable arm 30 is operated with the first movable arm 16 so that when the ignition switch 18 is moved to the "start" position for energizing the starting motor (not shown) of the automotive vehicle with which the present invention may be associated, the movable arm 30 conductively connects the stationary contact 28 with the stationary contact 24.

A warning means, preferably in the form of a warning lamp 32, has one terminal connected to the line 22 and the other terminal connected to one terminal of a resistor 34. The other terminal of the resistor 34 is connected to the stationary contact 28 via junction 36 and lead 38.

A solid-state switching network 40 is employed to control the energization of the warning means or lamp 32. This solid-state switching network 40 preferably includes a first transistor 42 and a second transistor 44. The first transistor 42 has one of its output electrodes, for example, its collector, connected to line 22 through resistor 46. Its other output electrode, for example, its emitter, is connected to the control or base electrode of transistor 44 via lead 48. The second transistor 44 has one of its output electrodes, for example, its collector, connected to the junction 36, and its other output electrode, for example, its emitter, connected to ground via lead 50.

Referring now to FIG. 2, there is shown a container 52 having a closure cap 54 for replenishment of a liquid 56 carried by the container 52. The container 52 is represented here in schematic form and it may be a radiator of an automotive vehicle, in which case the structure designated by the numeral 58 is the radiator core. The liquid in the container should have a liquid level 60 that covers this core.

A probe, generally designated by the numeral 62, includes an outer casing 64 in the form of a nut that is threaded into a socket 66 supported by the container 52. An electrical insulating bushing 68 electrically insulates the operative cylindrical portion 70 of the probe from the nut 64. This operating portion 70 of the probe may be constructed of a suitable metal, for example, steel or brass, and it extends into the liquid 56 when the liquid is at a satisfactory operating level, as indicated by the numeral 60. The container 52, in the case of a radiator, is also constructed of an electrically conductive material, for example, brass, copper or steel, and it has a lead 72 electrically connected to it.

Referring back to FIG. 1, it can be seen that the container 52, together with the central cylindrical portion 70 of the probe 62 and the liquid 56, comprises a portion of a voltage divider 74, the junction of which is designated by the numeral 76. The other portion of the voltage divider is a resistor 78 which is connected at its terminal opposite the junction 76 to an AC coupling means 80, preferably in the form of a capacitor.

A means for cyclically and periodically coupling the source of direct current electrical energy 10 to the voltage divider 74 through the AC coupling means 80 preferably takes the form of a bimetallic means 82. This bimetallic means 82 has an input terminal 84 connected to line 22 through a resistor 86 and lead 88, an output terminal 90 connected to the AC coupling means 80 through a lead 92 and another terminal 94 connected to ground through a lead 96.

A bimetallic blade 98 is supported at one end 100 that is connected to the output terminal 90. The other end thereof has a contact 102 positioned thereon that is adapted to engage contact 104 positioned on one end of conductive blade 106. The other end of conductive blade 106 is connected to the terminal 94. A heater winding 108, which is positioned in heat exchange relationship with the bimetallic blade 98, has one end connected to the input terminal 84 and the other end directly connected to the bimetallic blade 98 at the position 110 adjacent the contact 102.

A rectifying means, in the form of a diode 112 connected in parallel with the resistor 114, is connected at one terminal to the junction 76 and the control electrode or base of transistor 42 and at the other terminal to ground.

OPERATION

During starting operations of the automotive vehicle that employs the present invention, the ignition switch 18 is moved so that the movable arm 16 engages the "ON" terminal 20 and a start terminal (not shown) that is connected to the starter motor (not shown). Additionally, the movable arm 30 that operates with the movable arm 16 is moved so that it connects the stationary contact 28 with the stationary contact 26. This completes a circuit from the "ON" terminal 20 through line 22, warning means or lamp 32, resistor 34, lead 38, stationary contact 28, movable arm 30, stationary contact 24 and lead 26 to ground. This provides a means for checking the operative condition of the warning lamp or means when the engine of the vehicle employing the present invention is initially started.

After the engine is started, the movable arm 30 is moved to disconnect the stationary contact 28 from the stationary contact 26 thereby deenergizing the warning means or lamp 32. At the same time, the movable blade 16 stays in contact with the "ON" terminal 20 of ignition switch 18 so that the line 22 remains energized. With the line 22 energized, heater winding 108 of bimetallic means 82 is energized from input terminal 84 and is connected to ground at its other end via contact 102, contact 104, conductive blade 106, terminal 94 and lead 96. When sufficient heat is developed by the heater winding 108, the bimetallic blade 98 will flex to bring the contact 102 out of engagement with contact 104 and the voltage of the source of electrical energy 10 minus the voltage drops in resistor 86, heater winging 108 and bimetallic blade 98 is applied to the output terminal 90 via the heater winding 108 and bimetallic blade 98.

The passage of direct current from the output terminal 90 of bimetallic means 82 is blocked by the AC coupling means or capacitor 80 and, as a result, the heater winding 108 begins to cool. After a certain period of time, it flexes back to the position where the contact 102 is again in contact with the contact 104 on conductive blade 106 thereby again connecting the heater winding to ground via terminal 94 and lead 96, thus commencing another cycle of operation.

As a result of the above-described operation, a pulsating voltage appears at the AC coupling means or capacitor 80 which has, as its lower value, ground potential and which has, as its higher value, the voltage of the source of electrical energy 10 minus the voltage drops through resistor 86, heater winding 108 and bimetallic blade 98. The AC coupling means or capacitor 80 filters out or blocks the DC component of this pulsating electrical energy and, as a result, alternating current electrical energy is applied to the voltage divider 74, i.e., resistor 78 and the circuit comprised of the operative cylindrical portion 70 of the probe 62, container 52 and lead 72.

When the level of the liquid, shown in FIG. 2, is at a satisfactory operating level so that the operating portion 70 of the probe 62 is in engagement with or is immersed in the fluid 56, the potential appearing at the junction 76 of the voltage divider 74 and as rectified by the rectifying means comprising diode 112 and resistor 114 in insufficient to switch transistor 42 to a conducting state. With transistor 42 in a nonconducting state, there is no path for current into the base of transistor 44 and it will remain in a nonconducting state thereby keeping the warning means or lamp 32 unenergized.

If the level of the liquid 56 in the container 52 falls below a stationary operating level, for example, so that the operative cylindrical portion 70 of the probe 62 is no longer immersed in the liquid 56, the impedance between the operative portion 70 of the probe 62 and the container 52 increases markedly thereby raising the alternating current voltage appearing at the junction 76. This increase in voltage appears at the base of the transistor 42 after being rectified by the diode 112 and resistor 114.

The resulting voltage appearing at the base or control electrode of transistor 42 is sufficient to switch it into a conducting state thereby supplying base or control electrode current to transistor 44. This switches transistor 44 to a conducting state thereby energizing the warning means or lamp 32 from line 22 resistor 34 and the collector-emitter circuit of transistor 44.

The energization of the warning means or lamp 32 apprises the vehicle operator that the liquid level in the container 52 has fallen to an unsatisfactory level. He may, therefore, take corrective action to replenish the liquid 56 in the container 52 whereupon the operating portion 70 of the probe 62 will again be immersed in the liquid 56. When this occurs, of course, a voltage will no longer appear at the base of transistor 42 sufficient to keep it in a conducting state. As a result, both transistors 42 and 44 will be switched to nonconducting states and the warning lamp or means 32 will be deenergized.

Thus the present invention provides a reliable, inexpensive and uncomplicated low liquid level indicator which employs a minimum of parts and which utilizes alternating current to energize the liquid level sensing means in the form of a probe adapted to be immersed in the liquid.

I claim:

1. A low liquid level indicator including a container having a liquid positioned therein the level of which is to be indicated, a source of direct current electrical energy, a probe associated with said container, an AC coupling means, a bimetallic pulse-producing means coupled to said source of direct current electrical energy and to said AC coupling means for cyclically coupling said source of electrical energy to said probe through said AC coupling means, said bimetallic pulse-producing means including a bimetal blade having a fixed end connected to said AC coupling means, an electrical heater means positioned in heat exchange relationship to said bimetal blade, one terminal of said heater means being connected to said source of direct current electrical energy and the other terminal being connected to the free end of said bimetallic blade, and a stationary contact connected to ground and adapted to contact the free end of said bimetal blade, a low liquid level indicating means coupled to said probe and to said source of electrical energy, said probe including means cooperating with the liquid in said container for developing a first voltage level when said liquid is above a satisfactory operating level in said container and developing a second voltage level when said liquid is below a satisfactory operating level in said container, said indicating means including means responsive to said second voltage level for giving a warning indication when said liquid is below said satisfactory operating level.

2. A low liquid level indicator comprising a source of direct current electrical energy, a solid-state switching network having output electrodes and a control electrode, a warning means coupled to said source of electrical energy and the output electrodes of said solid-state switching network, a voltage divider comprising a resistor, a container having a liquid positioned therein, and a probe electrically insulated from said container, means connecting the junction of said resistor and said probe with said control electrode of said solid-state switching network, AC coupling means, means for cyclically coupling said source of electrical energy to said resister at its end opposite said junction through said AC coupling means, said last-mentioned means including a bimetal blade having one end thereof connected to said AC coupling means, an electrical heater means positioned in heat exchange relationship to said bimetal blade, one end of said electrical heater means being connected to said source of direct current electrical energy and the other end thereof connected to the other end of said bimetal blade, a stationary contact connected to ground, said other end of said bimetallic blade being in electrical contact with said stationary contact when said electrical heater means is unenergized and remaining in contact therewith until such time as said electrical heater means supplies a given amount of heat to said bimetal blade whereupon said other end of said bimetal blade moves out of engagement with said stationary contact and current through electrical heater means is interrupted, said probe including means for connecting said probe and said container through said liquid when said liquid is at a satisfactory operating level, the resistance value of said resistor and the impedance value of said probe, liquid and container being selected to provide a voltage level on the control electrode of said solid-state switching device to cause conduction of said solid-state switching network and energization of said warning means when the liquid is below a satisfactory operating level and another voltage level to cause nonconduction of said solid-state switching network when the liquid is above a satisfactory operating level.

3. The combination of claim 2 and further comprising a rectifying means connected to said junction and to said control electrode of said solid-state switch means for rectifying the AC signal emanating from said junction toward said control electrode.

* * * * *